United States Patent [19]

Bettcher

[11] Patent Number: 4,590,676

[45] Date of Patent: May 27, 1986

[54] BONING AND TRIMMING KNIFE AND HOUSING

[75] Inventor: Louis A. Bettcher, Amherst, Ohio

[73] Assignee: Bettcher Industries, Inc., Birmingham, Ohio

[21] Appl. No.: 717,491

[22] Filed: Mar. 28, 1985

Related U.S. Application Data

[62] Division of Ser. No. 330,553, Dec. 14, 1981, Pat. No. 4,509,261.

[51] Int. Cl.[4] .............................................. A22C 17/04

[52] U.S. Cl. ....................................... 30/276; 17/1 G

[58] Field of Search .................... 30/276, 347; 17/1 G

[56] References Cited

U.S. PATENT DOCUMENTS

| | | | |
|---|---|---|---|
| Re. 25,947 | 12/1965 | Bettcher | 30/276 |
| 2,827,657 | 3/1958 | Bettcher . | |
| 3,269,010 | 8/1966 | Bettcher | 30/276 |
| 3,461,557 | 8/1969 | Behring | 30/276 |
| 3,688,403 | 9/1972 | Bettcher | 30/276 |
| 3,852,882 | 12/1974 | Bettcher | 30/276 |
| 4,142,291 | 3/1979 | Bettcher | 30/276 |
| 4,166,317 | 9/1979 | Bettcher | 30/276 |
| 4,170,063 | 10/1979 | Bettcher | 30/276 |
| 4,175,321 | 11/1979 | Bettcher | 30/276 |
| 4,178,683 | 12/1979 | Bettcher | 30/276 |
| 4,198,750 | 4/1980 | Bettcher | 30/276 |
| 4,236,531 | 12/1980 | McCullough | 30/276 |
| 4,363,170 | 12/1982 | McCullough | 30/276 |
| 4,509,261 | 4/1985 | Bettcher | 17/1 G |

*Primary Examiner*—Jimmy C. Peters

*Attorney, Agent, or Firm*—Watts, Hoffmann, Fisher & Heinke

[57] ABSTRACT

A hand knife 20, 120, 220 of the type having a ring-like rotary driven blade 26, useful for cutting meat and the like; a blade housing 24, 124, 224 for a hand knife; and an improved circular blade 26. The blade housing has a generally circular groove 38, 138, 238 in one axial end 40, 140, 240 of the housing. The groove is as wide at the open end as inwardly to allow the blade to be inserted and removed in an axial direction. The housing receives and fully encloses a ring gear portion 56 of the blade while a cutting portion 60 extends from the groove. A blade retainer 28, 228 secured to the handle acts against a radial flange 62 of the blade when tightened, to retain the blade within the groove, and when loosened allows removal of the blade from the housing without removing or loosening the housing from the handle.

15 Claims, 17 Drawing Figures

BONING AND TRIMMING KNIFE AND HOUSING

This is a division of application Ser. No. 330,553 filed Dec. 14, 1981 now U.S. Pat. No. 4,509,261 issued Apr. 9, 1985.

DESCRIPTION

1. Technical Field

This invention relates to an improved hand knife of the type used for trimming meat with a rotary driven ring-like blade, and to an improved blade housing and blade.

2. Background Art

Rotary knives with ring-like power-driven blades are exemplified by structures shown in U.S. Pat. Nos. 2,827,657; Re. 25,947; 3,852,882; 4,170,063; and 4,198,750. Such knives have a rotary ring-like or annular blade, generally cylindrical or frusto-conical in form, sharpened at one axial end and incorporating gear teeth to form a ring gear portion at the other axial end. The ring gear portion is received in a ring-like housing that is secured to a handle and that supports or guides the blade for rotation. The blade is driven by a pinion carried by the handle. A flexible cable driven by an external motor, or an air motor incorporated into the handle, drives the pinion.

In some known constructions, e.g., those shown in U.S. Pat. No. 4,198,750 and others, the ring-like housing has an inturned lip that retains a ring-gear portion of the blade and is split to allow expansion for insertion and removal of the blade. Blade replacement requires removal of the blade housing from the handle, spreading of the split housing to release the blade, insertion of a new blade and reattachment of the housing to the handle. The moderate difficulty in doing this discourages blade changing by an operator during use. Other constructions, such as those of a larger type knife shown in U.S. Pat. No. Re. 25,947, utilized unsplit housing rings, but required an extending arm-like sector portion around one side of the blade and housing, to support a blade-retaining shoe held in place by several securing screws and located by stop screws. The shoe is clamped directly against the blade, squeezing it slightly against the housing to retain it. The operations required for the release and readjustment of the blade-retaining shoe for blade changing discourage blade substitution during a work shift. Also, the arm or sector of the hand piece is of a size and at a location that limits the capability of the knife to an extent unacceptable in smaller trimming knives, in which most portions of the blade and housing, rather than primarily a limited peripheral portion, are used in the cutting operation.

Cutting efficiency depends upon the use of a sharp blade. Yet, because of the difficulty in replacing blades during a work shift, an operator will typically only apply a sharpening steel to the blade while using the knife, in an attempt to maintain sharpness. After a day of use, or sometimes more, the housing or retaining shoe will be removed and the blade sharpened or replaced, typically by shop or maintenance personnel. Unfortunately, steeling of a blade does not maintain or produce an optimum cutting edge and substantially greater efficiency is achieved if a properly sharpened blade is substituted every two to four hours of use.

With known knives and housings, the gear teeth of the blade are exposed to the cut product at the inside blade periphery and tend to engage and carry the cut product in a circular path with the blade. This makes it more difficult to manipulate and control the knife in use.

Split housings cannot be hardened sufficiently to minimize wear while retaining enough spring to allow deformation. Thus, wear from blade pressure and rotation, especially at the peripheral wall of the housing remote from the handle and at the retaining lip underlying the pinion gear, where frictional forces are concentrated because of the manner of use, require frequent housing replacement. When housing lip wear occurs beneath the pinion gear, the resulting additional blade clearance risks loss of driving interengagement between the blade and drive pinion.

DISCLOSURE OF THE INVENTION

The present invention provides an improved rotary knife having a new and improved blade housing and blade that overcome the above disadvantages and permit convenient removal and replacement of the blade without removal of the housing, shoe retaining screws, or other parts of the knife from the handle, and without expanding a split housing to remove and replace a blade.

Certain embodiments feature specific advantages, such as economy of manufacture with accompanying lower costs of the housing, along with ease of housing replacement without loss of strength or rigidity.

The knife of the present invention comprises a handle, a ring-like blade housing removably attached to the handle, and a ring blade supported for rotation by the housing. The blade has gear teeth that form a ring gear portion received in the housing and a circular cutting edge that extends from the housing. The blade is driven by a pinion in the handle engaged with the ring gear portion. In use, a portion of the blade and housing is moved through a work body and cut product passes through the central open part of the blade and housing. The particular embodiments disclosed herein are used primarily to trim meat from bone.

The improved knife construction has a housing that receives and guides the blade without restricting insertion and removal of the blade. In the preferred embodiments, this is accomplished with a ring-like housing member that has an arcuate recess or groove open at one axial end of the housing. Inner concentric wall surfaces of the groove that guide the blade are spaced apart at the groove opening a distance as great as the thickest part of the blade that is received within the groove to allow free entry of the blade. The two concentric walls provide a very rigid housing construction, inhibiting housing flex during use. Where a thin profile of the blade and housing is desired over maximum rigidity, the inner concentric housing wall can in part be removed or omitted, e.g., along that portion of the housing farthest from the handle, that passes through the product during cutting.

The blade has a ring-gear portion received in the housing groove and a cutting portion extending from the open end of the groove. A circular flange formed by the ring gear portion extends about the periphery of the blade. A blade retainer secured to the handle engages the circular flange to retain the ring-gear portion within the groove. The blade retainer can be loosened relative to the handle and housing for blade removal and tightened to secure a blade, without adjustments, by finger-operable fasteners that remain secured to the handle.

In preferred embodiments of the invention, the housing is unsplit. Advantageously, it can be a circular ring of uniform axial height, secured to the handle by the clamping action of a retaining piece held to the handle by fasteners. The retaining piece can be circumferentially short because of the inherent rigidity of the housing ring. Because the housing wears in use and requires replacement, the use of a separate retaining piece is more economical than a housing having an integral enlargement by which it is secured to a handle.

Of particular advantage in the embodiments in which the housing portion that forms the concentric walls of the groove completely covers the teeth of the ring gear portion of the blade about both the inside and outside blade surfaces, is the isolation or shielding of the teeth from contact with the work product. This substantially reduces the friction between the rotating blade and the work product to inhibit the previous tendency of the blade to carry the sliced work in a circular path with the blade. Also, the presence of a wall wholly or partially about the inside surface of the blade adds rigidity to the housing and extends the housing life by taking part of the frictional wear between the blade and housing that otherwise was entirely borne by the outside wall.

Housing wear, especially beneath the drive pinion, experienced on the housing lip previously used to capture the blade in the housing is avoided by use of the blade retainer, which is a plate made of harder material than the housing and reversable or adjustable after significant wear occurs. In addition, omission of the housing lip shortens the axial length of the housing, resulting in greater blade length exposure that permits resharpening a greater number of times.

The blade retainer plate extends partially around the blade periphery (in all of the preferred embodiments less than half way around) and is narrow enough to avoid interfering with the manipulation of the knife during use. It clamps against the housing and underlies the peripheral flange of the blade to retain the blade without applying any clamping force and accompanying high frictional load to the blade. An edge surface defined by the thickness of the plate faces the blade and is arcuate in plan. In one embodiment of the plate the surface contour across the thickness dimension is symmetrical about a midplane through the plate thickness. This symmetry allows reversal of the plate for longer wear to accommodate greater surface wear on opposite plate faces. Preferably, the edge surface is in the form of a section of a cylinder. In another embodiment the edge surface is beveled and cooperates with a frustoconical blade surface. Due to the bevel, lateral adjustment of the plate compensates for wear and maintains the blade in the desired position. Reduced plate wear or adjustment after wear minimizes the risk of the blade moving axially in the housing to an extent that the ring gear teeth fail to adequately engage with the drive pinion.

The blade has an axially short intermediate portion directly adjacent the flange at the base of the gear teeth, with a contour that matches or mates with the edge surface of the blade-retaining plate. The contour of this blade portion accommodates the plate in a close and partially encircling relationship and facilitates plate reversal or adjustment.

As suggested by the foregoing, the present invention provides a hand knife for cutting meat and the like comprising a handle; a ring-like blade housing at one end of the handle; a continuous ring blade rotatable in the housing; said housing having an arcuate recess that opens toward one axial end of the housing, spaced inwardly of the outer periphery of the housing, and having an arcuate wall surface engageable by and at least partially encircling the blade, the greatest radius of the wall surface being at said one axial end of the housing to allow assembly of the blade with the housing from the said one axial end; said blade having gear teeth received in said recess, a cutting portion extending from the housing, and an exterior flange about the periphery of the blade; and a blade retainer movably connected to the handle, engageable with the housing, and located to oppose the exterior flange to retain the blade in the housing.

The above and other features and advantages of the invention will be better understood from the detailed description that follows.

BRIEF DESCRIPTION OF THE DRAWINGS

The details of the invention will be described in connection with the accompanying drawings, in which.

BEST MODE FOR CARRYING OUT THE INVENTION

Figure 1:
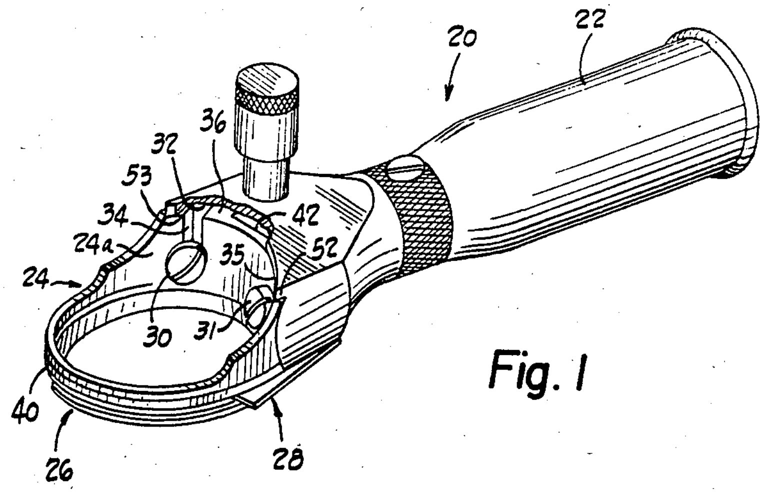
FIG. 1 is a perspective view of a first embodiment of the invention.

A hand knife 20 representing a first embodiment of the invention is shown in FIG. 1 and comprises a handle 22, a ring-like blade housing 24, a continuous ring blade 26 and a blade-retaining plate 28. The blade housing 24, which is removably secured to the handle 22 by screws 30, 31 rotatably guides the blade 26, which is removably held in the housing by the retaining plate 28.

As best shown in FIGS. 2-5, the blade housing 24 is a complete ring with an axially enlarged attachment portion *24a* that cooperates with an arcuate front seating surface 32 of the handle 22. Axial slots 34, 35 open through a top edge 36 of the housing portion *24a* and receive the attachment screws 30, 31. The slots 34, 35, by opening through the top edge 36, allow removal of the housing by loosening the screws and sliding the housing axially relative to the handle.

Figure 3:
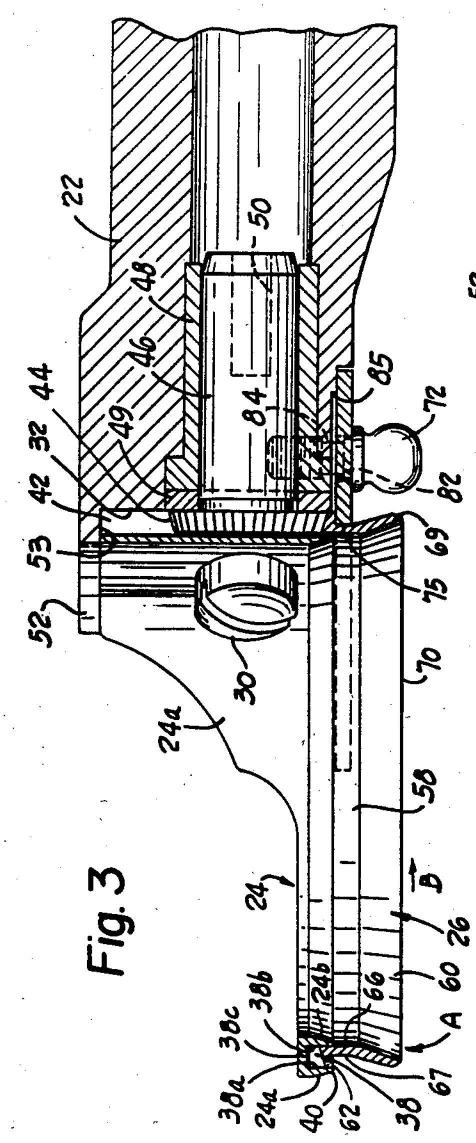
FIG. 3 is a longitudinal sectional view taken along the line 3—3 of FIG. 2.
Figure 4:
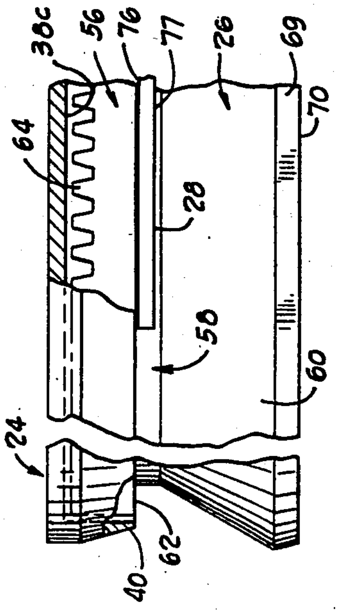
FIG. 4 is a fragmentary enlarged view, partly in section and party in elevation, of the housing and blade of FIG. 3.

A circular groove or recess 38 in the axial end 40 (the lower end in the orientation of FIGS. 1 and 3) of the housing receives the blade 26. Concentric inner wall surfaces *38a, 38b* are cylindrical and hence uniformly spaced from each other throughout the axial height to freely allow axial entry and removal of the blade 26 to and from the recess. It will be appreciated that concentric walls that diverge toward the recess opening would also permit entry and removal of the blade, which would have a matching contour within the groove. A top wall surface *38c* spans the distance between the walls *38a, 38b*. Outer wall surfaces *24a, 24b* of the housing are tapered as shown in FIGS. 3 and 4, except that the outer wall is not tapered where the enlarged portion *24a* abuts against the handle. This taper reduces the obstruction of product by the housing during use.

At the axially enlarged portion *24a* of the housing, an axial groove 42 is formed in the outside surface that faces the handle. A beveled pinion gear 44 extends from the front handle surface 32 into the groove 42 and enters the circular groove or recess 38 to drive the blade 26 in rotation. As illustrated in FIGS. 1 and 3, the groove 42 opens through the top edge 36 of the housing portion *24a* to permit the housing to be moved axially relative to the handle for removal. The pinion gear 44 has a shaft portion 46 that extends into the handle 22 and is supported for rotation in a sleeve bearing 48. A spacer 49 between the end of the sleeve bearing and the gear properly locates the gear for cooperation with the knife blade. The gear 44 in the embodiment shown is rotated by a flexible shaft or cable (not shown) that enters the back of the handle 22 and connects into an aperture 50 in the pinion gear shaft. Rotation of the shaft or cable by an external electric motor drives the pinion, which rotates the blade.

Figure 5:
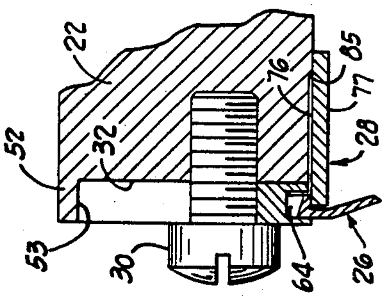
FIG. 5 is a partial sectional view taken along the line 5—5 of FIG. 2.
Figure 7:
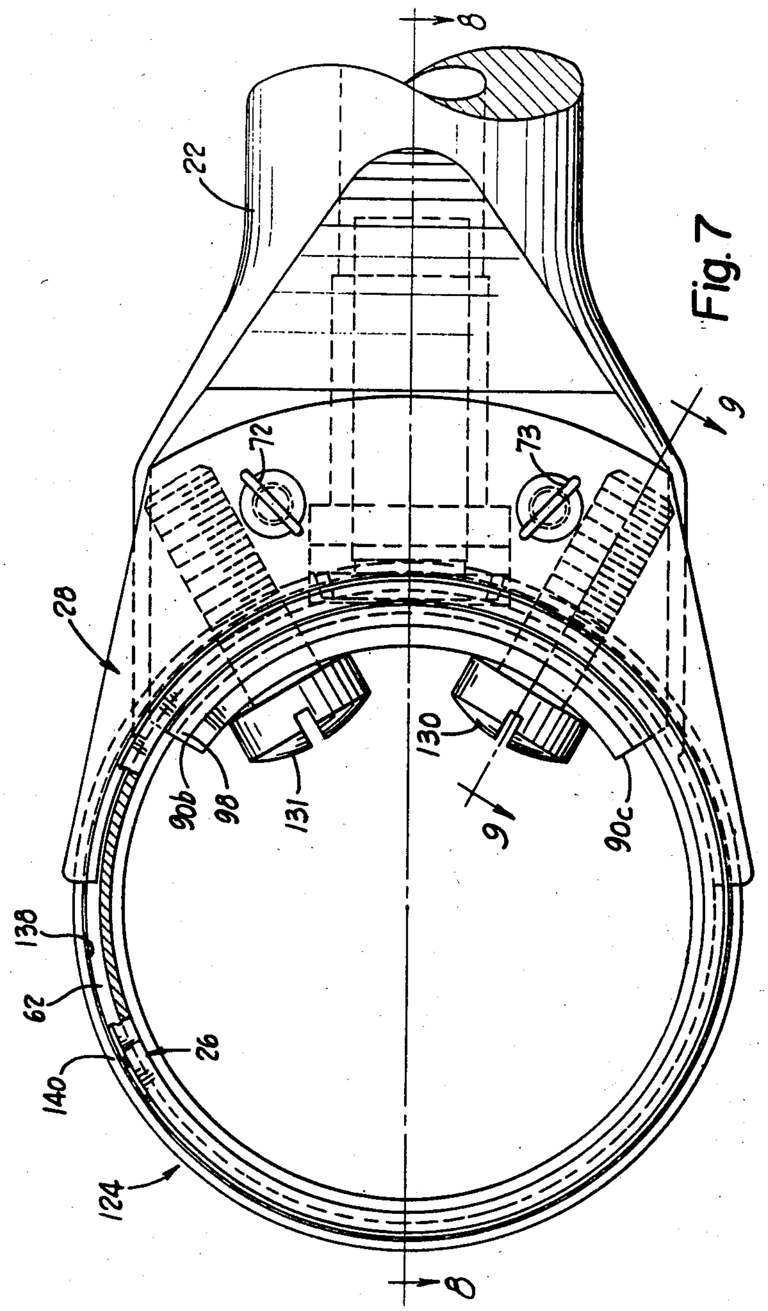
FIG. 7 is a bottom plan view of a portion of the embodiment of FIG. 6.

As shown in FIGS. 1, 3 and 5, the handle 22 has a flange or overhang 52 that extends beyond the seating surface 32 for the housing. The top edge 36 of the housing portion *24a* abuts a surface 53 of the flange, which locates the housing in a desired axial location relative to the handle. In addition, the blade-retaining plate 28 serves to also hold the housing in the desired location against the flange surface 53.

Figure 2:
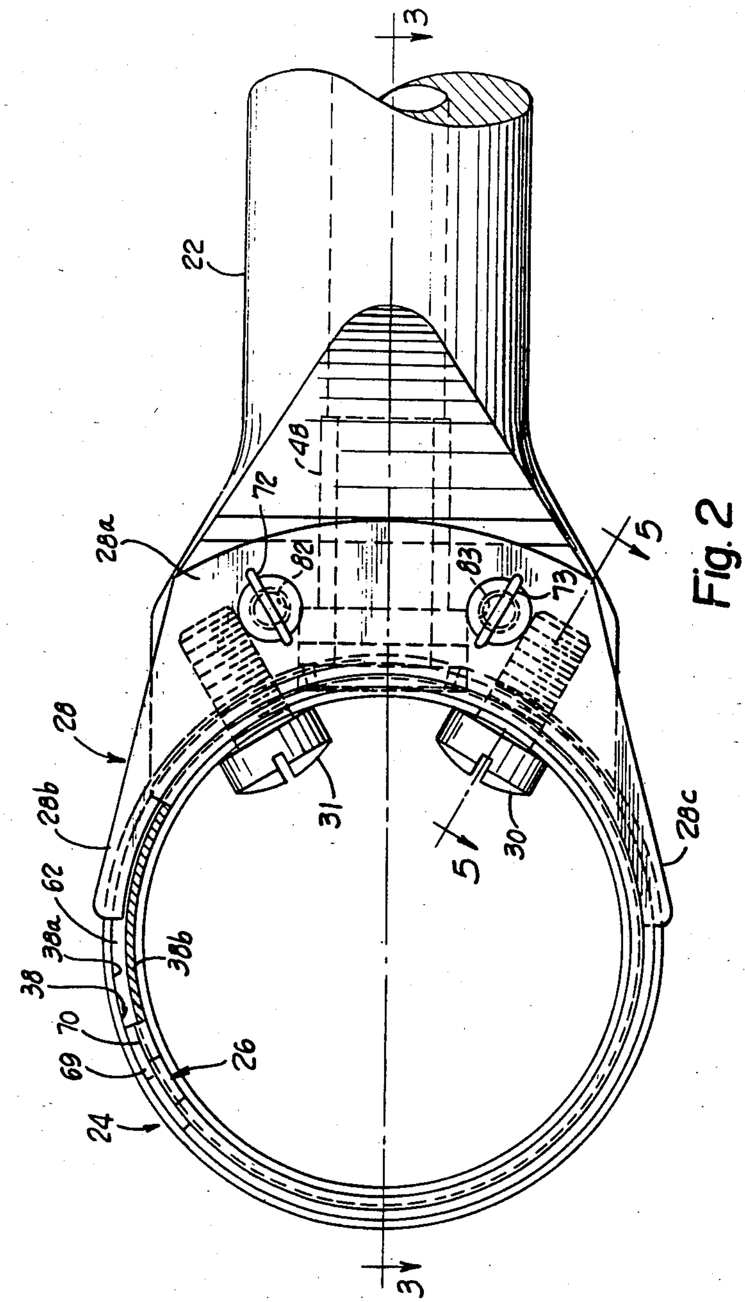
FIG. 2 is a bottom plan view of the embodiment of FIG. 1.

The blade 26, best shown in FIGS. 2–4 (and identically on an enlarged scale in FIG. 11 of the second housing embodiment), has an upper ring gear portion 56, an intermediate cylindrical portion 58 and a lower frustoconical blade portion 60. An external peripheral radial flange 62 is defined by the ring-gear portion at the juncture with the intermediate cylindrical portion by virtue of a greater radial thickness of the ring-gear portion than the intermediate cylindrical portion. Gear teeth 64 formed in the top surface of the blade extend completely about the blade and mesh with the pinion gear 44. As shown in FIGS. 3 and 4, the tooth depth of the ring gear portion is less than the depth of the groove or recess 38 from the housing end 40 to the top wall surface *38c* and the peripheral flange 62 is substantially flush with the lower end surface 40 of the housing.

The intermediate portion of the blade has an inside surface 66 and an outside surface 67, both of which are cylindrical, with the inside surface 66 being longer axially. The outside cylindrical surface 67 has an axial length equal to or just slightly greater than the thickness of the blade retaining plate 28.

The blade portion 60 is substantially longer axially than the intermediate cylindrical portion and is flared outward in the blade shown, a shape that is suitable for deboning meat. The blade portion 60 can be contoured differently for different purposes. The blade is ground along a surface 69 to produce a cutting edge 70.

The manner in which the blade 26 is retained in the housing 24 is shown in FIGS. 2–5. As illustrated in FIGS. 4 and 5, the height and width or thickness of the gear portion 56 in the groove or cavity 38 establishes a clearance at the top and side walls of the groove when the peripheral flange 62 is flush with the end surface 40 of the housing 24. The retainer plate 28 is secured to the handle 22 in a relationship that opposes the blade flange 62 and is located flush with the axial end of the housing to prevent the blade flange from moving out of the housing. A lateral clearance is provided between the retaining plate and the intermediate cylindrical portion 58 of the blade. As a result of this construction, the blade is freely rotatable between the housing and retaining plate.

As best shown in FIG. 2, the blade retaining plate 28 is generally yoke shaped, having a base portion *28a* for securing the plate to the handle with finger screws 72, 73, and having extending finger portions *28b, 28c* on each side of the housing, projecting forwardly of the handle. The plate 28 has a concave arcuate (substantially semi-circular) contour 75 facing the blade along the two finger portions and across the base portion. The surface of the arcuate portion has straight line elements perpendicular to opposite top and bottom faces 76, 77 of the plate; i.e., the thickness surface of the arcuate contour 75 is a segment of a cylinder that mates or matches with the outside surface 67 of the intermediate portion of the blade. The blade retaining plate closely surrounds the blade to oppose a portion of the peripheral radial flange 62 and also opposes the outer concentric wall 38 of the housing. The finger portions *28b, 28c* are narrow and extend only slightly beyond the outside wall periphery 80 of the housing, to avoid interference with knife manipulation during use.

The base portion *28a* of the retaining plate has two holes 82, 83 to receive the screws 72, 73. The screws each have a neck portion 84, shown in connection with the screws 72 in FIG. 3, that is smaller than the respective hole 82 or 83 and of an axial length greater than the thickness of the plate 28. Thus, when each screw is loosened a few turns, to place the neck portion 84 within the respective holes 82, 83, the plate 28 can readily tilt relative to the handle, spacing the finger portions *28b, 28c* away from the lower axial end 40 of the housing far enough to allow the blade 26 to drop out of the recess 38.

As shown in FIGS. 3 and 5, the base portion *28a* of the plate 28 overlies a small transverse step 85 that extends across the lower surface of the handle, displaced from the screws 72 in a direction away from the handle seating surface 32. The plate pivots on the step toward the housing when the screws 72, 73 are tightened. This assures that the finger portions *28b, 28c* of the retaining plate will be urged by the screws against the end surface 40 of the housing, to retain the blade at the proper level within the groove or recess 38 and to retain the housing against the handle locating flange 52.

The housing surface 40 serves as a stop to prevent the plate from squeezing the ring gear portion of the blade against the upper transverse wall surface 38c of the recess, which would frictionally retard rotation. The plate is angled very slightly relative to the surface 40 so the ends of the finger portions 28b, 28c first contact the housing end 40. As the screws 72, 73 are tightened the plate distorts somewhat, bringing the plate into contact with the end 40 along the entire arcuate contour 75.

Because the shape of the plate 28 in the thickness dimension along the arcuate contour 75 is cylindrical, the plate can be reversed (i.e., the surface 77 can be placed against the handle and housing instead of the surface 76) after surface wear occurs on the plate from blade rotation. It will be appreciated that a surface 75 contour other than cylindrical is acceptable if it is symmetrical about a plane midway through the thickness dimension of the plate (i.e., midway between the surfaces 76, 77) and shaped to cooperate, as by mating, with the external surface 67 of the intermediate portion of the blade in a way that allows the plate to effectively oppose the blade flange 62 and retain the blade in the housing. For example, the surface 75 could be convex in cross section and the surface 67 concave.

In use, much of the cutting performed with the knife is with that half of the blade that is remote from the handle, to which the arrow A points in FIG. 3. The cutting action in which the blade is moved into the product is often accompanied by a pulling movement of the knife in the direction indicated in FIG. 3 by the arrow B. With prior known housings having an underlying lip beneath the peripheral flange of the blade and lacking an inner wall surface 38b, wear was concentrated on the housing at the wall portion 38a farthest from the handle, i.e., in the region of arrow A, and at the lip underlying the blade flange beneath the pinion 44. These locations of wear were occasioned by the pressing and pulling action on the blade, forcing it against the surrounding housing wall and causing the blade to tilt, which pressed the peripheral flange downward in the area beneath the pinion. Lip wear in the area beneath the pinion would allow the blade to drop sufficiently that interengagement between the pinion and blade gear teeth would be lost. With the present arrangement, movement of the blade against the outer wall 38c in the area A by the pulling action of the knife in the direction indicated by the arrow B results in contact of the inside periphery of the knife blade with the inner wall 38b in the area of the housing adjacent the handle. As a result, portions of both the inside wall 38b and the outside wall 38c, which face the handle, will absorb wear, substantially doubling the life of the housing. Wear beneath the pinion 44 is taken by the plate 28 rather than a housing lip. Typically the plate 28 can be made of a harder, more abrasive-resistant material than the housing because it does not require substantial machining. In addition, the plate can be reversed to absorb twice the wear that a single surface could otherwise tolerate.

A second embodiment of the invention is shown in FIGS. 6–10, in which like reference numbers identify identical parts to those of the previous embodiment and similar but different parts are indicated by the same reference numeral but in a 100 series, and in the third embodiment, in a 200 series. A hand knife 120 is shown having a handle 22, a ring-like blade housing 124, a continuous ring blade 26 and a blade-retaining plate 28.

The blade housing 124 is a metal ring of uniform axial height (i.e., without the enlarged portion 24a of the previous embodiment) with a groove or recess 138 opening through an axial end 140. A portion of the outer periphery of the blade housing abuts against the arcuate front seating surface 32 of the handle and the housing is secured in place by a housing retaining plate 90 fastened to the handle by screws 130, 131. The plate 90 is arcuate and a major portion of a rear surface 92 conforms to the front seating surface 32. A recess 94 is formed in the rear surface of the plate to receive the pinion gear 44. Also, an arcuate recess 96 is formed in the rear surface 92, just above a lower edge 98 of the plate 90, for receiving the blade housing 124. When the plate 90 is secured to the handle, it rigidly holds the housing 124 in place against axial and transverse movement relative to the handle.

Figure 6:
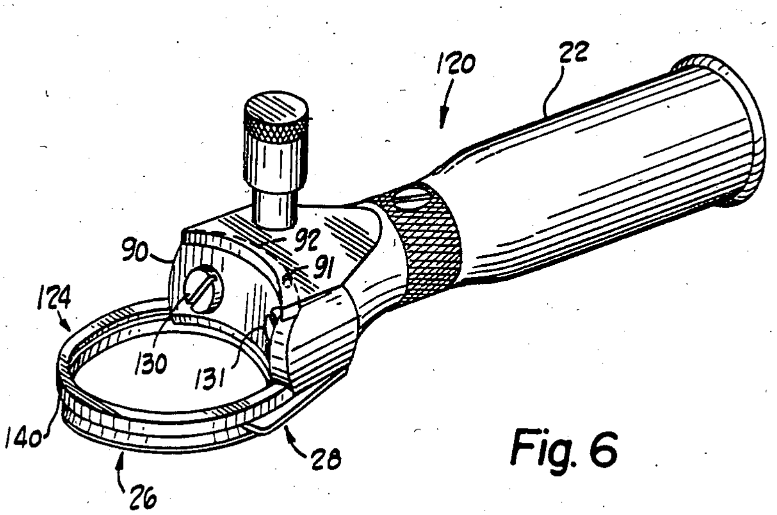
FIG. 6 is a perspective view of a second embodiment of the invention.
Figure 8:
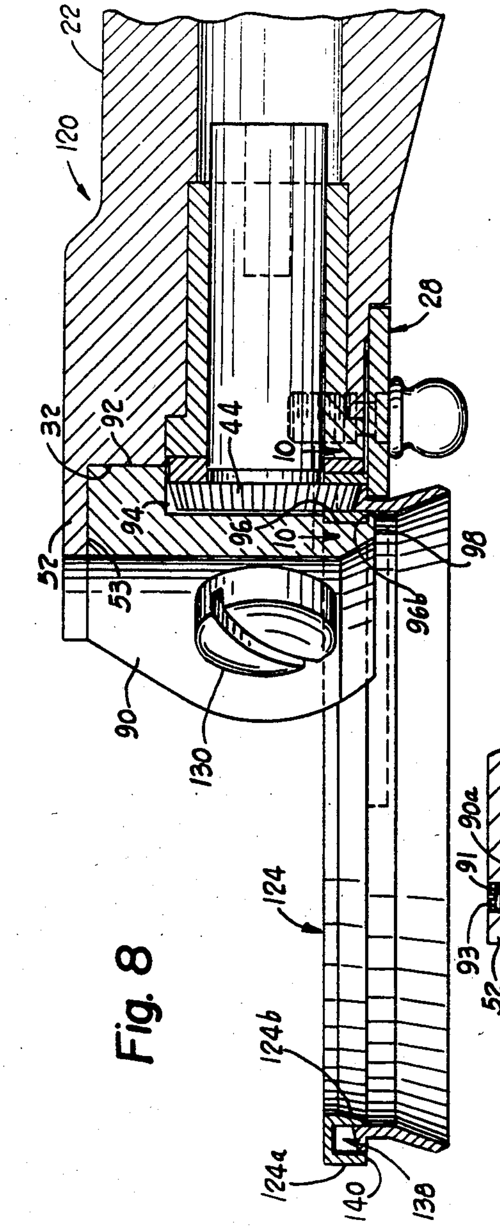
FIG. 8 is a longitudinal sectional view taken along the line 8—8 of FIG. 7.
Figure 9:
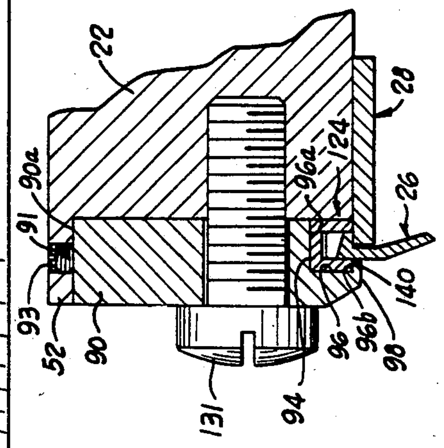
FIG. 9 is a partial sectional view taken along the line 9—9 of FIG. 7.
Figure 10:
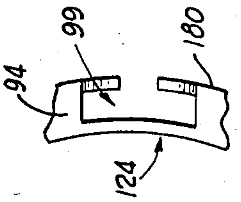
FIG. 10 is a partial top plan view of the blade housing of the embodiment of FIG. 6.

As shown in FIGS. 6, 8 and 9, the surface 53 of the flange or overhang 52 of the handle 22 opposes an edge surface 90a of the plate 90 to locate the plate in a desired axial location relative to the handle. In addition, the blade-retaining plate 28 serves to also hold the housing and the plate 90 in proper position with the plate against the overhang 52. Thus, the locations of the housing and housing retaining plate are not dependent upon the screws 130, 131, but rather upon the surface 53. A set screw 91 in a threaded aperture 93 of the flange 52 bears against the opposing surface 90a of the plate 90. When adjusted to extend beyond the surface 53 of the flange, to bear against the plate 90, the set screw serves as an adjustable locator for the plate and housing and can compensate for any cumulative error in dimensions of the plate 90 and housing 124. Alternatively, the integral flange 52 could be omitted and a separate flange member extending beyond the surface 32 could be threaded to the handle for adjustment axially of the housing; e.g. a screw with a wide, flat, head, spring tensioned or with lock threads for adjustment could be used.

As shown in FIGS. 8 and 9, an upper surface 96a of the recess 96 extends the full width of the housing ring, except where the pinion is received, and a lower surface 96b underlies the bottom end surface 140 of the housing that is located radially within the ring blade 26 and serves as a retaining lip for the housing.

The housing 124 has an opening 99 (FIG. 10) through a top surface 94 and through the outside wall periphery 180 of the housing 124 in the pinion area, for entry of the pinion into the housing to cooperate with the ring gear portion 56 of the blade 26.

Only one wall 124b (FIG. 8) of the housing is tapered in this embodiment and the taper is discontinued about that portion of the housing that fits within the groove 96 of the plate 90. The non-tapered wall 124a provides desired rigidity of the housing, which was not needed in the first embodiment because the enlarged portion 124a extended peripherally a greater distance.

The housing 124 of this embodiment is less expensive than the housing 24 and thus attachment using the reusable housing retaining plate 90 results in cost savings when housings are replaced. In addition, the radially inward projection by the plate 90 with respect to the housing, provides end surfaces 90b, 90c (FIG. 7) one of which faces against the direction of blade rotation and acts as an abutment to block or deflect cut pieces of the product being trimmed in the event the piece tends to travel about the housing due to blade friction.

As will be apparent from the drawings, the other structures of the embodiment of FIGS. 6–10 are identical to those already described in the embodiment of FIGS. 1–5.

Figure 11:
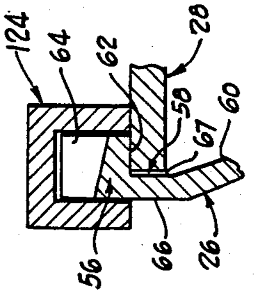
FIG. 11 is an enlarged partial sectional view of a portion of FIG. 9, with parts removed.
Figure 12:
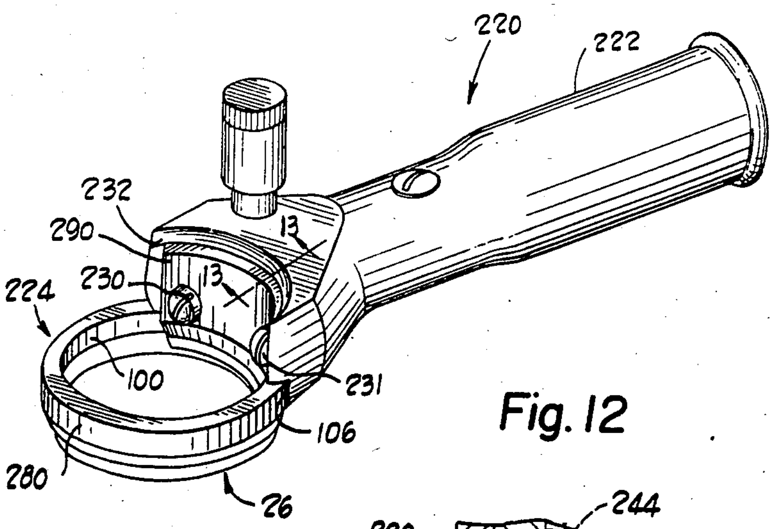
FIG. 12 is a perspective view of a third embodiment of the invention.

A third embodiment is shown in FIGS. 11 and 12, in which like numbers identify parts identical to those of the previous embodiments. A hand knife 220 is shown having a handle 222, a ring like blade housing 224, a continuous ring blade 26, and a blade retaining plate 228.

The blade housing 224 is similar to the housing 124, but a groove 238 opening through the axial end 240 is bounded by an inner concentric wall 100 that is axially longer than an outer concentric wall 280. The inner wall has a beveled outer surface **224*b*** at the lower axial end thereof.

An arcuate seating surface 232 at the front of the handle 222 has an inset, downwardly facing, step 106 of a depth equal to the width of the housing ring which serves to locate the housing and provide a firm seat. The housing is held in place by the clamping force of a housing retaining plate 290, which is arcuate in shape and has a rear surface 109 that arcuately conforms with the surface 232 of the handle. The housing retaining plate has a beveled surface 110 adjacent a lower end surface 112. The plate is secured to the handle by screws 230, 231. No keys are required to locate the housing retaining plate, because the housing is located by the inset step 106 of the handle and by the bladeretaining plate. The axial relationship of the housing retaining plate to the housing is not critical.

The housing 224 has an opening 298 in a top surface 294 to receive the pinion 44 to facilitate driving the blade.

The blade retaining plate 228 is smaller than the blade retaining plates 28 and 128, being slightly narrower than the width of the handle where it joins the housing. It is secured to the handle by two screws, one of which is shown at 273 in FIG. 12. The plate 228, in addition to retaining the blade in the housing, helps retain the housing in proper position relative to the handle by abutting the bottom edge of the outer wall 280. Because the plate 228 presses against the edge of the wall 280, it does not exert any clamping force on the blade that would retard rotation.

Figure 13:
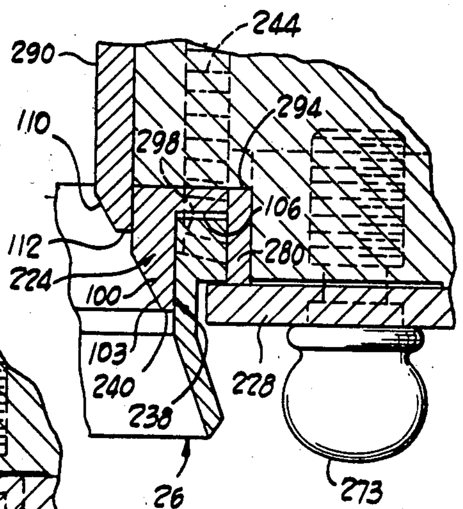
FIG. 13 is a partial sectional view taken through a vertical plane of the embodiment of FIG. 12, approximately along the line 13—13.
Figure 14:
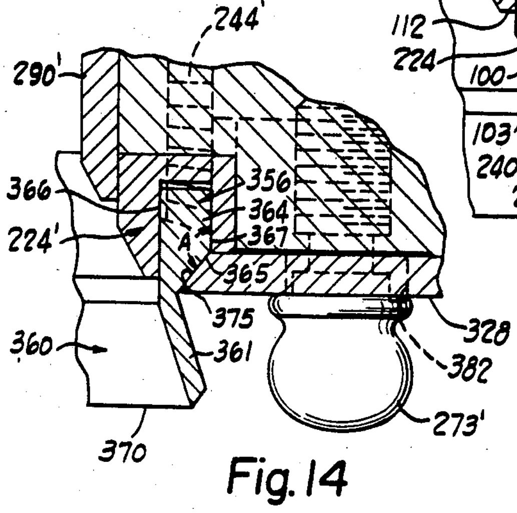
FIG. 14 is a partial sectional view of a fourth embodiment of the invention.

A fourth embodiment is shown in FIG. 14, which for purposes of illustrating the modified feature is shown with a housing and handpiece structure similar to that of FIGS. 12 and 13, but which is equally applicable to the housing and handpiece structures of the other embodiments. Parts identical to those of the embodiment of FIGS. 12 and 13 are identified with like reference numerals and a prime designation. This construction utilizes a novel blade 360 and a novel blade retaining plate 328. As shown, the blade 360 has a ring gear portion 356 having a plurality of gear teeth 364, an exterior peripheral flange 365, and a thinner frusto-conical portion 361 that flares outwardly as it extends from the flange away from the ring gear portion. The thinner portion 361 terminates in a circular cutting edge 370. In the preferred embodiment, the thinner blade portion is flared at an angle, preferably between 15 and 20 degrees, from a cylindrical surface 366 forming the inside diameter of the ring gear portion, and in all events the diameter of the cutting edge will be at least as great as that of the surface 366.

The exterior flange 365 is frusto-conical in shape in the preferred embodiment, and extends the full distance from the outer cylindrical periphery 367 of the ring gear portion to the thinner blade portion 361 at an included angle A of approximately 135 to 140 degrees with respect to the cylindrical periphery.

The blade retaining plate 328 has a concave, arcuate, substantially semi-circular surface 375 facing the blade and cooperating with the frusto-conical flange 365 to retain the blade within the housing 224'. To this end, the surface 375 is beveled to a comparable angle to that of the flange 365 and contacts the flange to retain the blade in the housing while allowing rotation, i.e., without applying radial force to bind the blade against the inside housing wall. Upon wear between the blade and retaining plate, lateral movement of the plate toward the blade will take up any play that develops and because of the bevel will also keep the blade properly positioned axially within the housing to maintain engagement of the teeth 364 with the driving pinion 244'. Adjustment of the retaining plate is accommodated by two apertures 382 that are larger than the portion of the retaining screws, one of which is shown at 273', that pass through the apertures and clamp the plate to the handpiece. Thus this construction affords compensation for retainer plate wear or blade wear by lateral movement rather than reversal of the plate. It has the advantage of maintaining the ring gear portion of the blade at a constant axial position within the housing, through adjustment, in spite of substantial wear, but unlike the other plates, must be adjusted with care to avoid binding or clamping the blade against the housing.

Figure 15:
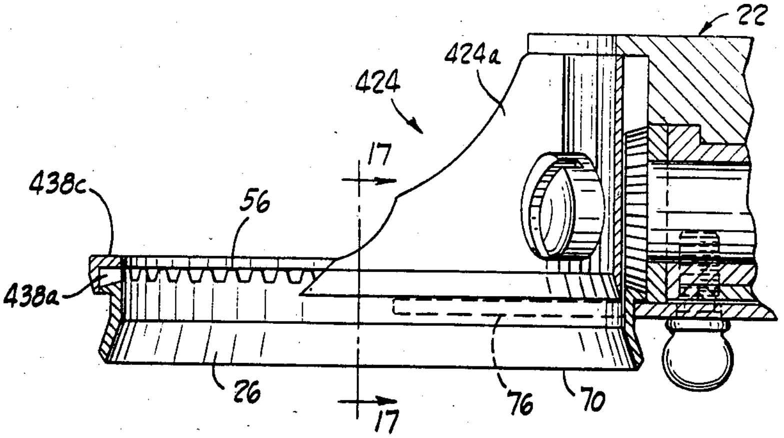
FIG. 15 is a partial sectional view from the midplane of a modified housing construction similar to the first embodiment.
Figure 16:
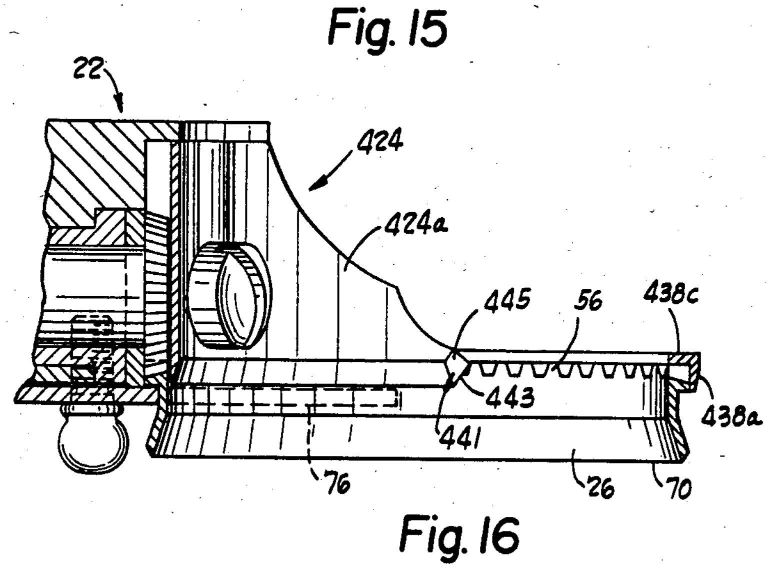
FIG. 16 is a partial sectional view of the modified housing of FIG. 15, viewed from the midplane, looking in the opposite direction from FIG. 15.
Figure 17:
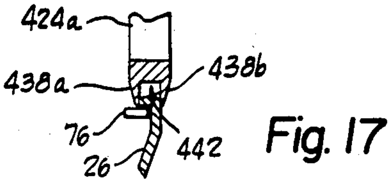
FIG. 17 is a partial sectional view of the housing of FIG. 15 taken along the line 17—17.

A ring blade housing 424 similar to the housing 24, but of modified construction, is shown in FIGS. 15–17. In the housing 424, a portion of the housing 24 forming the inner wall surface **38*b* has been removed or omitted about a portion of the housing; in this case, about that portion of the housing that extends beyond the axially enlarged attachment portion 424*a*. This results in a groove 442, in the portion of the housing adjacent the handle 22, formed by walls 438*a* and 438*b*; and the remaining portion of the housing is L-shaped, formed by walls 438*a* and 438*c* about the outer periphery and across the ring gear portion 56 of the blade 26. Both housing portions form a circular recess in which the blade rotates. The blade is retained in the housing by a plate 76, as in the embodiment of FIG. 1. Housing wear at that portion of the outer wall 438*a* remote from the handle is reduced by the presence of the partial inner wall 438*b*** adjacent the handle, and a thin housing and blade profile is achieved at the portion of the housing remote from the handle that passes through the product during use.

At the terminus 441 of the inside wall **438*b* of the housing, on the side of the enlarged attachment portion 424*a* toward which the blade is moving in a circular direction, a knife edge 443 is formed. The edge is at the end of an inclined surface 445 that forms a bevel and is slanted partially toward the cutting edge 70**, to deflect any product that tends to be carried along with the rotating blade relative to the housing.

While preferred embodiments of the invention have been described with particularity, it will be understood that modifications can be made therein without departing from the spirit and scope of the invention set forth in the appended claims.

I claim:

1. A gear-driven ring blade for a hand knife of the type used for cutting meat and the like, said blade comprising: a ring gear portion having a plurality of gear teeth; an exterior peripheral flange adjacent the gear teeth tapering from the ring gear portion inwardly; a thinner portion extending from the flange away from the ring gear portion; and a circular cutting edge on the thinner portion, the diameter of the cutting edge being at least as great as the inside diameter of the ring gear portion.

2. A ring blade as set forth in claim 1 wherein the tapered flange extends from the outside periphery of the ring gear portion to the thinner portion.

3. A ring blade as set forth in claim 1 or 2 wherein the thinner portion of the blade flares outwardly.

4. A hand knife for cutting meat and the like comprising a handle; a ring blade housing at one end of the handle having an acruate recess that opens toward an axial end of the housing; a continuous ring blade rotatable in the housing, said blade having gear teeth received in said recess, a cutting portion extending from the housing, and a circular flange by which the blade is retained in the housing recess; a pinion carried by the handle and engageable with the blade; an axially elongated member that secures the housing to the handle and covers the pinion; and means including a blade retainer connected to the handle and located to in part oppose the blade flange to retain the blade in the housing without clamping the blade against the housing.

5. A hand knife for cutting meat and the like comprising a handle; a ring-like blade housing at one end of the handle; a continuous ring blade rotatably guided by the housing, at least partially encircled by a peripheral housing wall, and having a cutting portion extending axially from the housing that terminates in a cutting edge and a frusto-conical peripheral surface that converges toward the cutting edge; and a blade retainer connected to the handle for movement toward and away from the frusto-conical surface of the blade and having an edge surface that engages the frusto-conical surface when the retainer is moved toward the blade and cams the blade axially toward the housing.

6. A hand knife for cutting meat and the like comprising a handle, a ring blade housing at one end of the handle, a ring blade rotatable in the housing about a central axis and having a transverse annular surface facing axially away from the housing by which it is retained in the housing, a drive member carried by the handle and engageable with the blade, said housing being in part L-shaped in cross section and having an axially extending peripheral wall about a portion of the blade, one part of the L-shaped portion being formed by said peripheral wall, and means, including a blade-retaining shoe movably secured to the handle and movable relative to the housing adjacent the handle, to selectively retain and release the blade for removal from the housing without clamping the blade against the housing, said shoe having a portion that opposes the transverse annular surface of the blade to retain the blade in the housing.

7. In a hand knife of the type used for cutting meat and the like, the combination of a gear-driven ring blade comprising a ring gear portion having a plurality of gear teeth, an exterior peripheral flange adjacent the gear teeth tapering from the ring gear portion inwardly, a thinner portion extending from the flange away from the ring gear portion, and a circular cutting edge on the thinner portion, the diameter of the cutting edge being at least as great as the inside diameter of the ring gear portion; and a blade retainer having an arcuate beveled surface extending fewer than 180 angular degrees that substantially conforms in shape to said peripheral flange and that engages the flange in use to retain the blade in a blade housing.

8. The combination as set forth in claim 7 wherein the blade retainer includes mounting openings that permit adjustment of the retainer in a direction perpendicular to a central axis of the ring blade to permit axial adjustment of the blade in a housing.

9. A hand knife for cutting meat and the like comprising a handle; a ring-like blade housing at one end of the handle; a continuous ring blade rotatable in the housing; said blade having gear teeth received in said recess, a cutting portion extending from the housing, and an exterior flange about the periphery of the blade; a housing retainer cylindrically arcuate and extending in the arcuate direction a distance substantially equal to that of said one end of the handle and extending axially a distance greater than that of the housing, releasably secured to said handle and releasably engaging said housing, securing it to the handle; and a blade retainer movably connected to the handle and located to oppose the exterior flange to retain the blade in the housing without applying clamping force to the blade.

10. A hand knife as set forth in claim 9 wherein said housing retainer includes a groove that faces the handle and receives a portion of the housing.

11. A hand knife as set forth in claim 9 wherein the handle has a surface that locates the housing retainer relative to the handle in an axial direction of the housing.

12. A hand knife as set forth in claim 9 wherein the handle has an arcuate recess that receives a portion of the housing.

13. A ring blade housing for a hand knife for cutting meat and the like comprising a circular ring portion, a lip-free integral flange portion of cylindrical contour extending axially from the outside periphery of the ring portion to at least partially encircle a rotary ring blade guided by the housing, an an integral axially elongated mounting portion extending from the ring in an axial direction opposite to that of said flange, for securing the housing to a handle, the inside periphery of the ring portion being free of any axial flange at a location remote from said mounting portion.

14. In a hand knife for cutting meat and the like: a ring blade housing supportable on a handle; and a ring blade rotatable in the housing about a central axis and having ring gear teeth at one axial end and receivable in the housing, a circular cutting edge at the opposite axial end, and a transverse annular surface facing away from the gear teeth by which the blade is retained in the housing; said housing having a circular ring portion, a lip-free integral flange portion of cylindrical contour to at least partially encircle the ring blade and extending axially from the outside periphery of the ring portion a distance greater than the axial distance from said transverse annular surface of the blade to the said one axial end that incorporates the gear teeth, said ring having a mounting portion adapted to be located adjacent and secured to a supporting handle, and the inside periphery of the ring portion being free of any axial flange at a location remote from said mounting portion.

15. The housing as set forth in claim 13 or 14 including a cylindrically shaped arcuate wall adjacent the mounting portion of the housing extending axially from the inside periphery of the ring portion in the same axial direction as said flange portion.

* * * * *